United States Patent
Kim (10) Patent No.: US 7,861,279 B2
(45) Date of Patent: Dec. 28, 2010

(54) APPARATUS AND METHOD FOR INCREASING CHANNEL CHANGING SPEED IN DMB RECEIVING TERMINAL

(75) Inventor: Hyung-Jun Kim, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 664 days.

(21) Appl. No.: 11/702,916

(22) Filed: Feb. 6, 2007

(65) Prior Publication Data

US 2007/0234386 A1 Oct. 4, 2007

(30) Foreign Application Priority Data

Feb. 6, 2006 (KR) ...................... 10-2006-0011207

(51) Int. Cl.
- *H04N 7/20* (2006.01)
- *H04N 7/173* (2006.01)
- *H04H 20/71* (2008.01)

(52) U.S. Cl. ........................... 725/139; 725/63; 725/68; 725/73; 725/142; 455/3.01

(58) Field of Classification Search ................... 725/62, 725/63, 73, 68, 135, 139, 142; 455/3.01, 455/3.05, 422.1

See application file for complete search history.

(56) References Cited

U.S. PATENT DOCUMENTS

| | | | | |
|---|---|---|---|---|
| 7,307,671 | B2 * | 12/2007 | Garandeau | 348/731 |
| 7,466,367 | B2 * | 12/2008 | DaCosta | 348/730 |
| 2004/0114052 | A1 * | 6/2004 | Sin | 348/570 |
| 2005/0060744 | A1 | 3/2005 | Kim et al. | |
| 2005/0174483 | A1 | 8/2005 | Ruckriem | |
| 2005/0210504 | A1 | 9/2005 | Ko et al. | |
| 2006/0064727 | A1 * | 3/2006 | Cho | 725/68 |
| 2006/0168638 | A1 * | 7/2006 | Yang | 725/131 |
| 2007/0082607 | A1 * | 4/2007 | Hong et al. | 455/3.06 |

FOREIGN PATENT DOCUMENTS

| | | |
|---|---|---|
| EP | 1 524 787 | 1/2004 |
| KR | 1020010036163 | 5/2001 |
| KR | 1020010081402 | 8/2001 |
| KR | 1020020084929 | 11/2002 |
| KR | 1020040063381 | 7/2004 |
| WO | WO 99/16247 | 4/1999 |
| WO | WO 2005/053313 | 6/2005 |

* cited by examiner

*Primary Examiner*—John W Miller
*Assistant Examiner*—John Schnurr
(74) *Attorney, Agent, or Firm*—The Farrell Law Firm, LLP (57) ABSTRACT

An apparatus and method is provided for increasing a channel change speed in a Digital Multimedia Broadcasting (DMB) receiving terminal. The apparatus includes a DMB buffering unit for buffering DMB data, a DMB extractor for extracting only DMB data of a currently set channel, and a controller for setting a changed channel into a DMB signal-receiving unit so that a DMB program can be output using extracted DMB data. DMB data output from the DMB signal-receiving unit is stored in the DMB buffering unit, and DMB data according to a channel set by the user is extracted. Thus, a channel change can be performed without stopping or restarting a DMB receiving operation of the DMB receiving unit, and the time required for the channel change is reduced.

12 Claims, 6 Drawing Sheets

APPARATUS AND METHOD FOR INCREASING CHANNEL CHANGING SPEED IN DMB RECEIVING TERMINAL

PRIORITY

This application claims priority under 35 U.S.C. §119 to an application entitled "Apparatus and Method for Increasing Channel Changing Speed in DMB Receiving Terminal" filed in the Korean Intellectual Property Office on Feb. 6, 2006 and assigned Serial No. 2006-11207, the contents of which are incorporated herein by reference.

BACKGROUND OF THE INVENTION

1. Field of the Invention

The present invention relates generally to a digital multimedia broadcasting (DMB) receiving terminal, and in particular, to an apparatus and method for changing a DMB channel according to a user's key input data, wherein the channel is not a transmission channel for carrying DMB data but a broadcasting channel for outputting DMB content in a DMB receiving terminal.

2. Description of the Related Art

In general, DMB is a broadcasting service for providing high image and sound quality, and an improved service to users by replacing conventional analog broadcasting. The recent development of DMB technology and improvements in mobile communication technology have caused an increasing interest in DMB service for viewing DMB programming even when in motion. Accordingly, a DMB program can be received using a mobile communication terminal in which is installed an omni-directional DMB receiving antenna. DMB can be classified into satellite DMB (S-DMB) in which a broadcasting signal output from a DMB station is transmitted to a satellite for relaying, and is broadcasted from the satellite to the ground, and terrestrial DMB (T-DMB) in which a broadcasting signal is broadcasted from a ground DMB station in a similar manner to conventional radio broadcasting.

A mobile communication terminal, which can receive and reproduce a DMB signal, includes a DMB signal receiving unit for receiving the DMB signal, extracting DMB data according to a channel set by a user, decoding the extracted DMB data, and outputting the decoded DMB data. The DMB signal receiving unit confirms channel information of a channel selected or pre-set by the user and receives DMB data according to the channel information. The channel information may be Packet Elementary Stream Packet Identification (PES PID) of the DMB data according to the channel or a DMB frequency according to the channel.

The DMB signal-receiving unit also extracts audio/video data or information data by parsing the received DMB data, demultiplexes the extracted data, and outputs the demultiplexed data to a controller of the mobile communication terminal. The controller of the mobile communication terminal decodes the input audio/video data or information data using an equipped DMB module and outputs a DMB program by outputting the decoded audio data and video/information data to an amplifier and a display unit.

Figure 1:
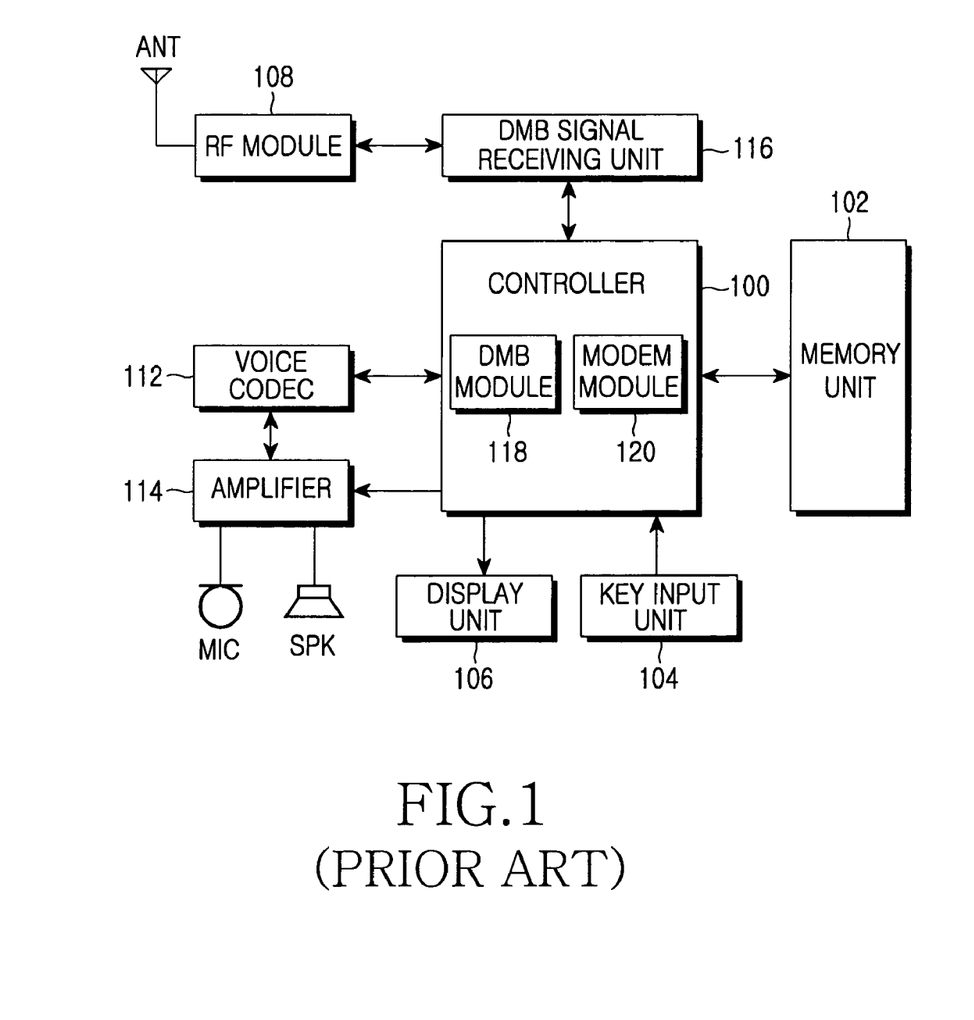
FIG. 1 is a block diagram of a conventional DMB receiving terminal.

FIG. 1 is a block diagram of a conventional DMB receiving terminal.

Referring to FIG. 1, the conventional DMB receiving terminal includes a DMB signal receiving unit 116, an amplifier 114, a display unit 106, and a key input unit 104, which are connected to a controller 100. If a key is pressed by a user, the controller 100 sets a channel according to the pressed key in the DMB signal receiving unit 116. The DMB signal-receiving unit 116 receives DMB data of the channel according to the pressed key. The DMB signal-receiving unit 116 also parses and demultiplexes converted DMB data and outputs the demultiplexed data to the controller 100. The controller 100 decodes the input data and outputs the decoded data to the amplifier 114 and the display unit 106.

Thus, if the user changes the channel, the conventional DMB receiving terminal should perform several procedures. That is, reception of DMB data from a currently set channel must stop, in order to change a channel in the conventional DMB receiving terminal. If a new channel is set without stopping reception of DMB data in the DMB signal receiving unit 116, video and audio data is input to the controller 100 through two channels, causing a problem in the integrity of DMB data. Thus, when a channel is changed in the conventional DMB receiving terminal, the controller 100 stops receiving DMB data by outputting a reception stop signal to the DMB signal receiving unit 116 before a new channel is set. After the channel is changed, the controller 100 controls the DMB signal receiving unit 116 to receive DMB data corresponding to the new channel.

Figure 2:
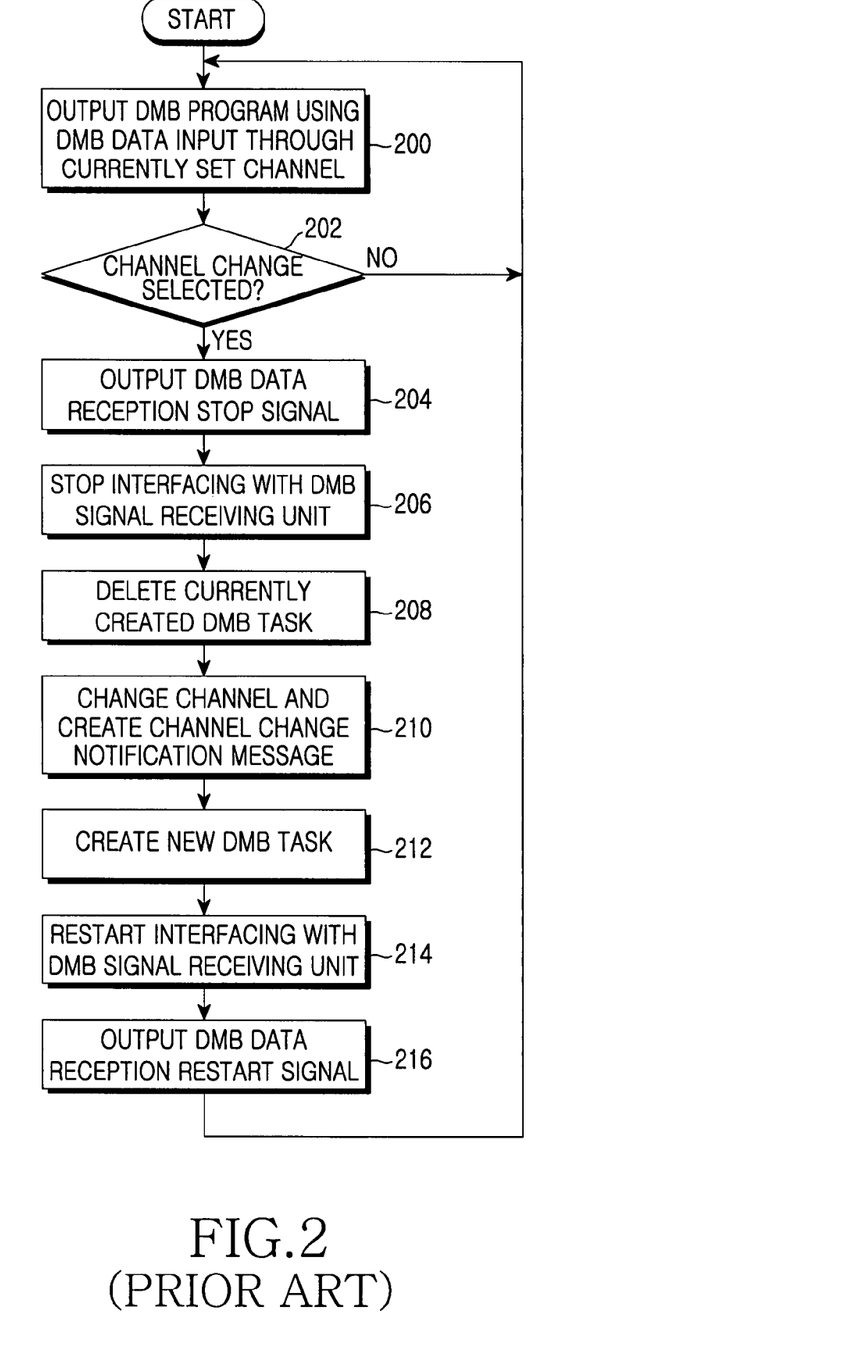
FIG. 2 is a flowchart illustrating a method for a controller of the conventional DMB receiving terminal of FIG. 1 to change a channel according to a key input of the user.

FIG. 2 is a flowchart illustrating a method for the controller 100 of the conventional DMB receiving terminal of FIG. 1 to change a channel according to a key input of the user.

Referring to FIG. 2, if power of the conventional DMB receiving terminal is turned on, the controller 100 outputs a DMB program corresponding to DMB data input through a currently set channel in step 200. The controller 100 determines in step 202 whether a user changes the channel. If it is determined in step 202 that the user has changed the channel, the controller 100 outputs a DMB data reception stop signal to the DMB signal receiving unit 116 in step 204 so that the DMB signal receiving unit 116 stops receiving the DMB data.

The controller 100 temporarily stops interfacing with the DMB signal-receiving unit 116 in step 206. In step 208 the controller 100 deletes a DMB task, which has been created using the DMB data input through the existing channel. Herein, the DMB task is an inner processing to output a DMB program corresponding to input DMB data.

The controller 100 sets a new channel according to a key input of the user into the DMB signal receiving unit 116, creates a message for notifying of a channel change, and outputs the created message to the display unit 106 in step 210. The controller 100 creates a new DMB task for outputting a DMB program corresponding to DMB data to be received through the newly set channel in step 212. The controller 100 restarts interfacing with the DMB signal-receiving unit 116 in step 214. The controller 100 outputs a DMB data reception restart signal to the DMB signal-receiving unit 116 in step 216 so that the DMB signal-receiving unit 116 restarts receiving the DMB data. In this case, the DMB signal-receiving unit 116 receives the DMB data through the newly set channel, and the controller 100 outputs a DMB program of the newly set channel using the newly created DMB task.

Thus, whenever the user changes a channel in the conventional DMB receiving terminal, a process of stopping and restarting reception of DMB data in the DMB signal receiving unit 116 must be performed. In this case, time is required for the DMB signal receiving unit 116 to select a new channel and receive DMB data through the new channel, for setting the DMB signal receiving unit 116 not to receive DMB data, and for setting the DMB signal receiving unit 116 to receive DMB data again. Thus, it is necessary to reduce the time that is spent by changing a channel in the conventional DMB receiving terminal.

SUMMARY OF THE INVENTION

An object of the present invention is to substantially solve at least the above problems and/or disadvantages and to provide at least the advantages below. Accordingly, an object of the present invention is to provide an apparatus and method for reducing a time required for a channel change in a DMB receiving terminal.

Another object of the present invention is to provide an apparatus and method for performing a channel change of a DMB receiving terminal without an additional process of stopping or restarting a DMB data reception operation of a DMB signal receiving unit in the DMB receiving terminal.

According to the present invention, there is provided an apparatus including a DMB signal receiving unit for confirming channel information of a broadcasting channel selected by a user and receiving DMB data according to the selected broadcasting channel, a DMB buffering unit for storing the received DMB data, a DMB extractor for confirming channel information according to the selected broadcasting channel and extracting DMB data according to the confirmed channel information from among the DMB data stored in the DMB buffering unit, and a controller, which includes a DMB module for outputting a DMB program by decoding the DMB data extracted by the DMB extractor, for setting, if the user selects a specific broadcasting channel, the selected specific broadcasting channel into the DMB signal receiving unit and the DMB extractor.

According to the present invention, there is provided a method including an output stop step, wherein a controller of a DMB receiving terminal stops outputting DMB data received before a broadcasting channel is changed, a broadcasting channel setting step, wherein the controller sets the changed broadcasting channel into a DMB signal receiving unit and a DMB extractor, a receiving step, wherein the DMB signal receiving unit receives DMB data according to the changed broadcasting channel, a storing step, wherein a DMB buffering unit stores the DMB data received through the changed broadcasting channel, an extracting step, wherein the DMB extractor extracts DMB data according to the changed broadcasting channel from among the stored DMB data, and a DMB program output step, wherein the controller receives the extracted DMB data and outputs a DMB program according to the changed broadcasting channel.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail for the sake of clarity and conciseness.

In the present invention, a DMB receiving terminal includes a DMB buffering unit for buffering DMB data, a DMB extractor for extracting only DMB data of a currently set channel, and a controller for setting, if a user changes a channel, the changed channel into a DMB signal receiving unit and outputting a DMB program corresponding to the DMB data extracted by the DMB extractor. If DMB data is input from the DMB signal receiving unit, the DMB buffering unit stores the input DMB data, and the DMB extractor extracts DMB data according to the channel set by the user from among the DMB data stored in the DMB buffering unit. Thus, in the present invention, if the user changes a channel, DMB data according to the changed channel is stored in the DMB buffering unit, and the DMB extractor extracts only DMB data according to the channel set by the user from among the DMB data stored in the DMB buffering unit. Accordingly, since a channel can be changed without stopping or restarting a process for DMB signal receiving unit to receive DMB data, a time required to change a channel can be reduced.

Figure 3:
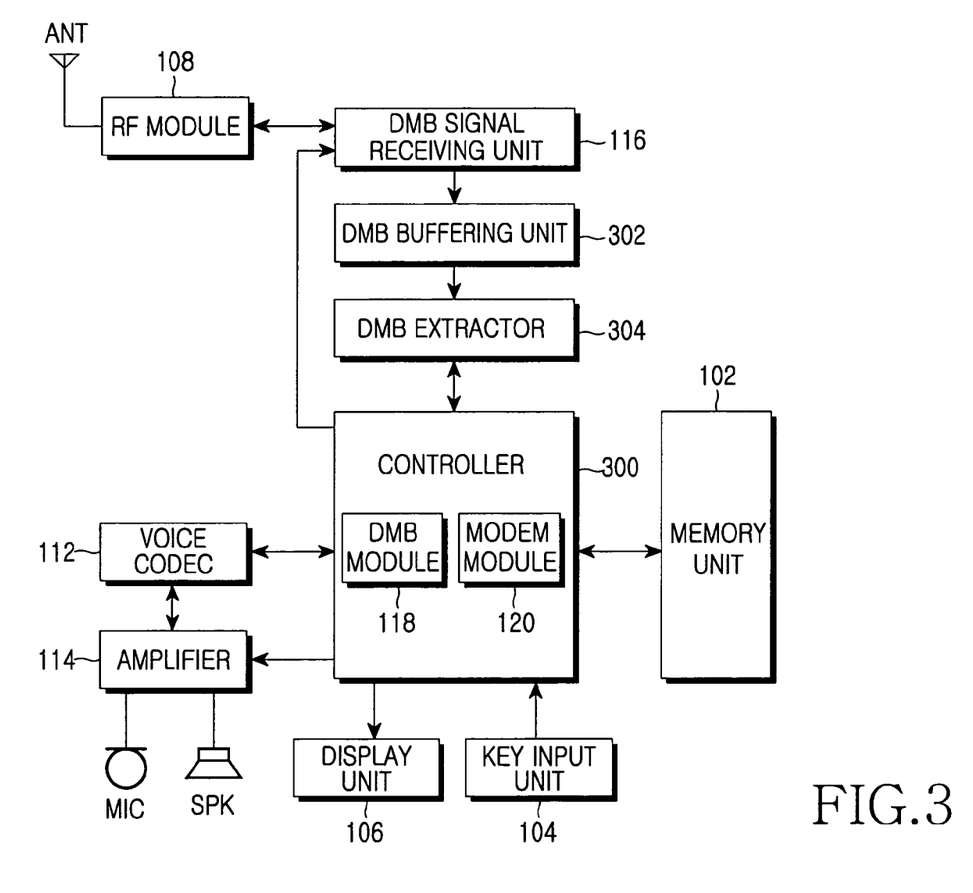
FIG. 3 is a block diagram of a DMB receiving terminal according to the present invention.

FIG. 3 is a block diagram of a DMB receiving terminal according to the present invention.

Referring to FIG. 3, in the DMB receiving terminal, a memory unit 102, a key input unit 104, a display unit 106, a voice coder-decoder (CODEC) 112, an amplifier 114, a DMB extractor 304 and a DMB signal receiving unit 116 are connected to a controller 300. The controller 300, which includes a DMB module 118 and a modem module 120, processes a voice signal or data according to a protocol for a telephone call, data communication, or a wireless Internet connection using the modem module 120, and controls components of the DMB receiving terminal. The controller 300 receives key input data of the user from the key input unit 104, creates image information according to the key input data, and controls the display unit 106 to display the created image information. The controller 300 receives audio and video data included in DMB data from the DMB receiving unit 116 using the DMB module 118, decodes the received audio/video data, and outputs the decoded audio/video data to at least one of the amplifier 114 and the display unit 106.

If a key for a channel change is pressed by the user, the controller 300 temporarily stops interfacing performed to receive DMB data, deletes a DMB task for outputting a DMB program according to a channel set before the channel is changed, and sets a channel changed by the user into the DMB receiving unit 116 and the DMB extractor 304. Thereafter, the controller 300 restarts the interfacing performed to receive DMB data, creates a new DMB task for outputting a DMB program according to the new channel, receives DMB data according to the changed channel and outputs a DMB program of the changed channel using the received DMB data.

The DMB receiving unit 116 receives a broadcasted DMB signal, analog-to-digital converts the received DMB signal, extracts DMB data of a channel set by the controller 300, and extracts data for a DMB program of the set channel by parsing the extracted DMB data. Herein, the data for a DMB program may be video, audio or information data of the set channel. The DMB receiving unit 116 demultiplexes the extracted data and outputs the demultiplexed data to a DMB buffering unit 302.

The DMB buffering unit 302 is a storage unit for storing DMB data input from the DMB receiving unit 116. The DMB extractor 304 connected to the controller 300 confirms channel information of the channel set by the controller 300, extracts only DMB data according to the confirmed channel information from among the DMB data stored in the DMB buffering unit 302, and outputs the extracted DMB data to the controller 300.

Thus, if a user changes a channel, DMB data according to at least one channel is stored in the DMB buffering unit 302. However, only DMB data of a changed channel is extracted by the DMB extractor 304, and the extracted DMB data is input to the controller 300. Then, the controller 300 outputs only a DMB program of the channel changed by the user using the DMB data input from the DMB extractor 304 as described above.

DMB data of the previous channel, which is stored in the DMB buffering unit 302, is deleted while the DMB program of the channel changed by the user is being output after completing the channel change. This delete operation is performed without considering the channel change. Thus, in the present invention, even if a user changes a channel, a process of receiving a DMB signal in the DMB receiving unit 116 does not have to stop. Thus, a time spent by stopping and restarting receiving a DMB signal when a channel is changed can be saved.

The memory unit 102 connected to the controller 300 includes a Read Only Memory (ROM), a flash memory, and a Random Access Memory (RAM). The ROM stores programs and various types of reference data for processing and controlling of the controller 300, the RAM provides a working memory of the controller 300, and the flash memory provides an area for storing various types of updatable storage data.

The key input unit 104 includes various keys including numeric keys and provides key input data input by the user to the controller 300. A radio frequency (RF) module 108 transmits/receives an RF signal to/from a base transceiver station (BTS) (not shown). The RF module 108 also converts a signal received from the BTS to an intermediate frequency (IF) signal and outputs the IF signal to a baseband processing unit (not shown) included in the DMB receiving unit 116, and converts an IF signal input from the baseband processing unit to an RF signal and transmits the RF signal to the BTS. The baseband processing unit, which is a baseband analog Application Specific Integrated Circuit (ASIC) (BBA) for providing an interface between the controller 300 and the RF module 108, converts a baseband digital signal input from the controller 300 to an analog IF signal and outputs the analog IF signal to the RF module 108, and converts an analog IF signal input from the RF module 108 to a baseband digital signal and outputs the converted baseband digital signal to the controller 300.

The voice CODEC 112 connected to the controller 300 is connected to a microphone and a speaker through the amplifier 114, outputs voice data, which is obtained by pulse code modulation (PCM) coding a voice signal input from the microphone through the amplifier 114, to the controller 300, and outputs a voice signal, which is obtained by PCM decoding voice data input from the controller 300, to the speaker through the amplifier 114. The amplifier 114 amplifies a voice signal input from the microphone or output to the speaker, and a volume of the speaker and a gain of the microphone are controlled by the controller 300.

Figure 4:
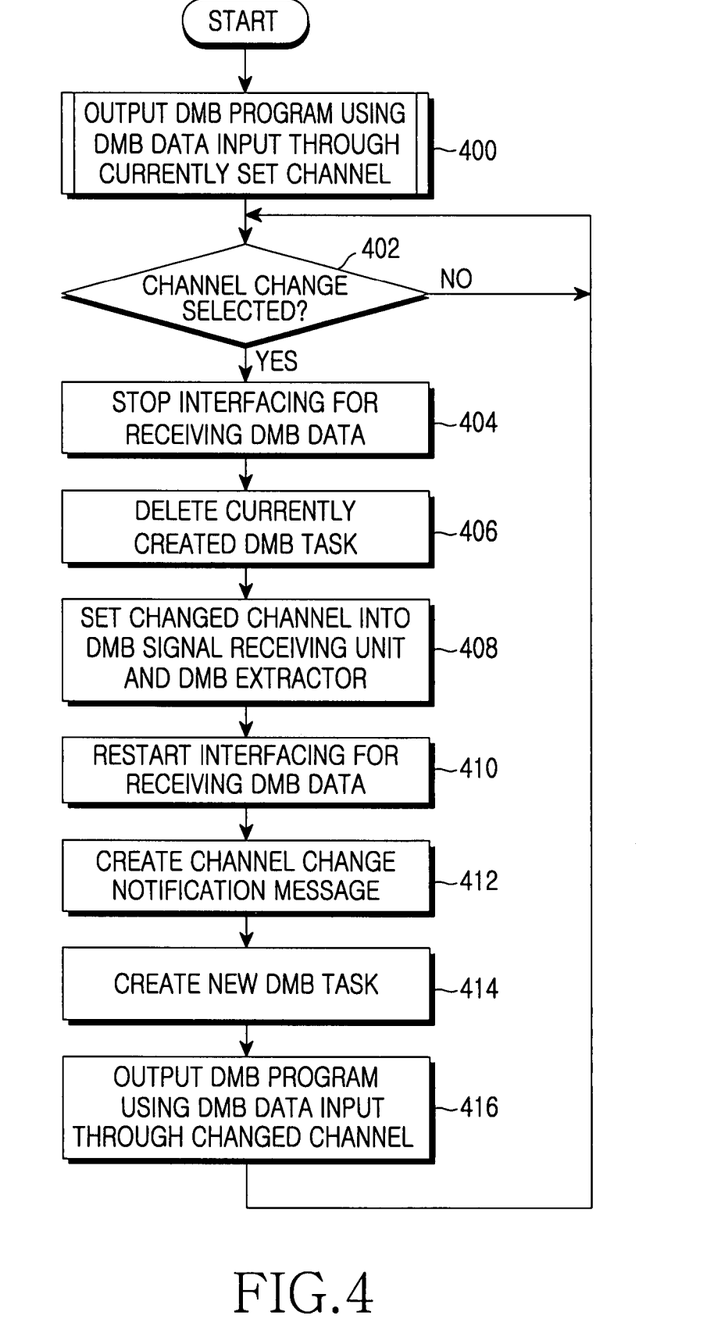
FIG. 4 is a flowchart illustrating a method of changing a broadcasting channel in a DMB receiving terminal according to the present invention.

FIG. 4 is a flowchart illustrating a method of changing a broadcasting channel in a DMB receiving terminal according to the present invention.

Referring to FIG. 4, when power of the DMB receiving terminal is turned on, the controller 300 stores DMB data input from the DMB receiving unit 116 in the DMB buffering unit 302, controls the DMB extractor 304 to extract only DMB data according to a currently set channel from among the stored DMB data, receives the extracted DMB data from the DMB extractor 304, and outputs a DMB program of the currently set channel using the received DMB data in step 400. The process of step 400 will be described later in detail with reference to FIG. 5.

The controller determines in step 402 whether a user selects a channel change. If it is determined in step 402 that the user has selected the channel change, the controller 300 stops interfacing for receiving DMB data from the DMB receiving unit 116 in step 404. In step 406, the controller 300 deletes a DMB task, which has been created, i.e., a DMB task created for outputting a DMB program of the channel set before the channel change is selected.

The controller sets a channel changed according to the selection of the user into the DMB receiving unit 116 and the DMB extractor 304 in step 408. The DMB receiving unit 116 begins a channel change process for receiving DMB data according to the changed channel, and the DMB extractor 304 confirms channel information according to the changed channel to extract DMB data according to the channel set by the user. The DMB receiving unit 116 receives DMB data according to the changed channel and outputs the received DMB data to the DMB buffering unit 302. Thus, the DMB data according to the changed channel is stored in the DMB buffering unit 302. The DMB extractor 304 extracts only DMB data according to the changed channel from the DMB buffering unit 302 and outputs the extracted DMB data to the controller 300.

In the DMB buffering unit 302, the DMB data according to the changed channel is stored in a state where the DMB data received before the channel change is performed still remains. However, since only DMB data of a channel selected by the user is extracted by the DMB extractor 304 and is input to the controller 300, the controller 300 can output a DMB program of the channel selected by the user.

If the DMB receiving terminal according to the present invention is for S-DMB, the channel change process of the DMB receiving unit 116 may be a process of setting a new channel by searching for a Packet Element Stream Packet Identification (PES PID) of an S-DMB channel according to a channel selected by the user from a Walsh code map. If the DMB receiving terminal according to the present invention is for T-DMB, the channel change process of the DMB receiving unit 116 may be a process of tuning the DMB receiving unit 116 to an Ensemble frequency according to a channel selected by the user. Accordingly, the process of confirming channel information according to the changed channel in the DMB extractor 304 may be a process of setting a PES PID according to the channel selected by the user in order to extract only packet data having the PES PID according to the channel selected by the user from among the DMB data stored in the DMB buffering unit 302.

After completing the process of setting the changed channel into the DMB receiving unit 116 and the DMB extractor 304 in step 408, the controller 300 restarts interfacing with the DMB extractor 304 in step 410 to receive DMB data. The controller 300 creates and outputs a channel change notification message for notifying the user that the current channel is changed, during a time required for the DMB receiving unit 116 to receive DMB data of the channel selected by the user. Thus, when the DMB receiving unit 116, the DMB buffering unit 302 and the DMB extractor 304 are performing a process of confirming channel information of the changed channel, extracting only DMB data of the changed channel, and outputting the extracted DMB data to the controller 300, the controller 300 notifies the user that the current channel is being changed in the DMB receiving terminal. Thus, an additional time for creating the channel change notification message is unnecessary.

The controller 300 creates a new DMB task for outputting a DMB program using DMB data received through the changed channel in step 414. After creating the new DMB task, the controller 300 receives DMB data according to the changed channel from the DMB extractor 304, decodes the received DMB data using the new DMB task, and outputs a DMB program of the changed channel by outputting the decoded DMB data to the display unit 106 and the amplifier 104 in step 416.

The process of step 416 is similar to the process of step 400. However, while only DMB data of the previously set channel is stored in the DMB buffering unit 302 in step 400, DMB data of at least one channel is stored in the DMB buffering unit 302 due to the channel change in step 416. Thus, in step 416, only DMB data according to the changed channel from among DMB data according to the at least one channel, which is stored in the DMB buffering unit 302, is extracted, and the controller 300 outputs a DMB program using the extracted DMB data.

Thus, the process of stopping receiving DMB data in the DMB receiving unit 116 and the process of restarting receiving DMB data are unnecessary. As a result, a time required for changing a channel is reduced.

Figure 5:
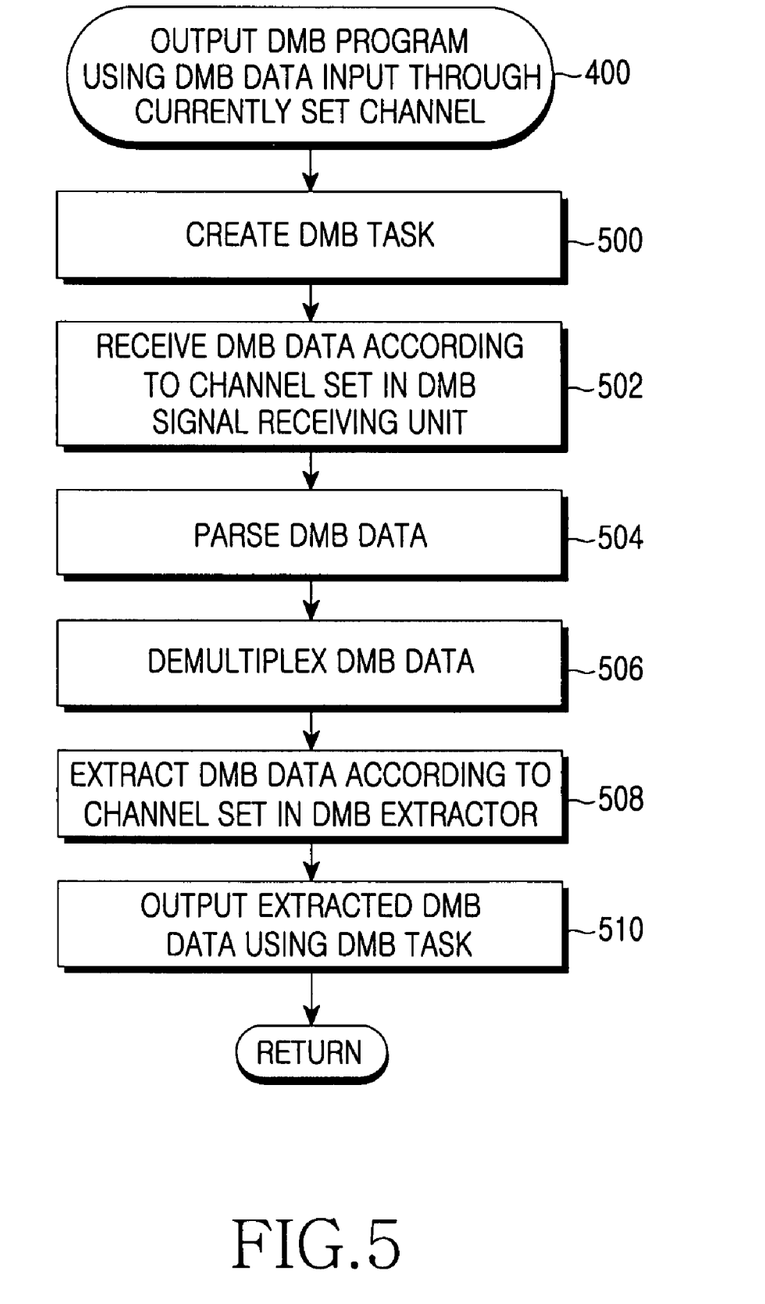
FIG. 5 is a flowchart illustrating a process of outputting a DMB program in a DMB receiving terminal according to the present invention.

FIG. 5 is a flowchart of step 400 illustrated in FIG. 4, according to the present invention.

Referring to FIG. 5, when power of the DMB receiving terminal is turned on, the controller 300 creates a DMB task for outputting a DMB program of a currently set channel in step 500. The controller 300 receives DMB data through the DMB receiving unit 116 in step 502. Specifically, the DMB receiving unit 116 receives a DMB signal transmitted from a DMB satellite or a ground DMB station, converts the received DMB signal to digital DMB data, and receives only DMB data according to the set channel from among the converted digital DMB data.

The controller 300 extracts video and audio data for a DMB program by parsing the DMB data input through the DMB receiving unit 116 in step 504. The controller 300 demultiplexes the extracted video and audio data in step 506. Thus, the demultiplexed video and audio data are stored in the DMB buffering unit 302.

The controller 300 controls the DMB extractor 304 to extract only DMB data of the currently set channel from the DMB buffering unit 302 in step 508. Herein, a PES PID may be used in step 508 as described above. That is, the process of step 508 may be a process of checking PES PIDs of the DMB data stored in the DMB buffering unit 302 and extracting only DMB data having a PES PID according to the currently set channel. The controller 300 receives the extracted DMB data from the DMB extractor 304 in step 510. Thereafter, the controller 300 decodes the received DMB data using the created DMB task and outputs the decoded DMB data to the display unit 106 and the amplifier 114. Thus, the DMB program of the currently set channel is output in the DMB receiving terminal, and the controller 300 determines in step 402 of FIG. 4 whether the user changes the currently set channel.

As described above, unlike a conventional DMB receiving terminal, a process of storing DMB data output from the DMB receiving unit 116 in the DMB buffering unit 302 is performed by the DMB receiving terminal according to the present invention. In addition, in the DMB receiving terminal according to the present invention, a process of extracting DMB data according to a currently set channel from the DMB buffering unit 302 and outputting the extracted DMB data to the controller 300 is performed. However, a storage space of the DMB buffering unit 302 for storing DMB data is limited. Thus, in the present invention, after the DMB extractor 304 extracts DMB data of a specific channel, the extracted DMB data is deleted in the DMB buffering unit 302.

If the user changes a channel of the DMB receiving terminal according to the present invention, DMB data of at least one channel is stored in the DMB buffering unit 302. In addition, after the channel is changed, DMB data received according to the previous channel before the channel change is not extracted by the DMB extractor 304. Thus, the DMB data received according to the previous channel before the channel change remains in the DMB buffering unit 302. The DMB receiving terminal according to the present invention deletes the DMB data remaining in the DMB buffering unit 302 by performing an additional process of deleting the DMB data received according to the previous channel before the channel change.

Figure 6:
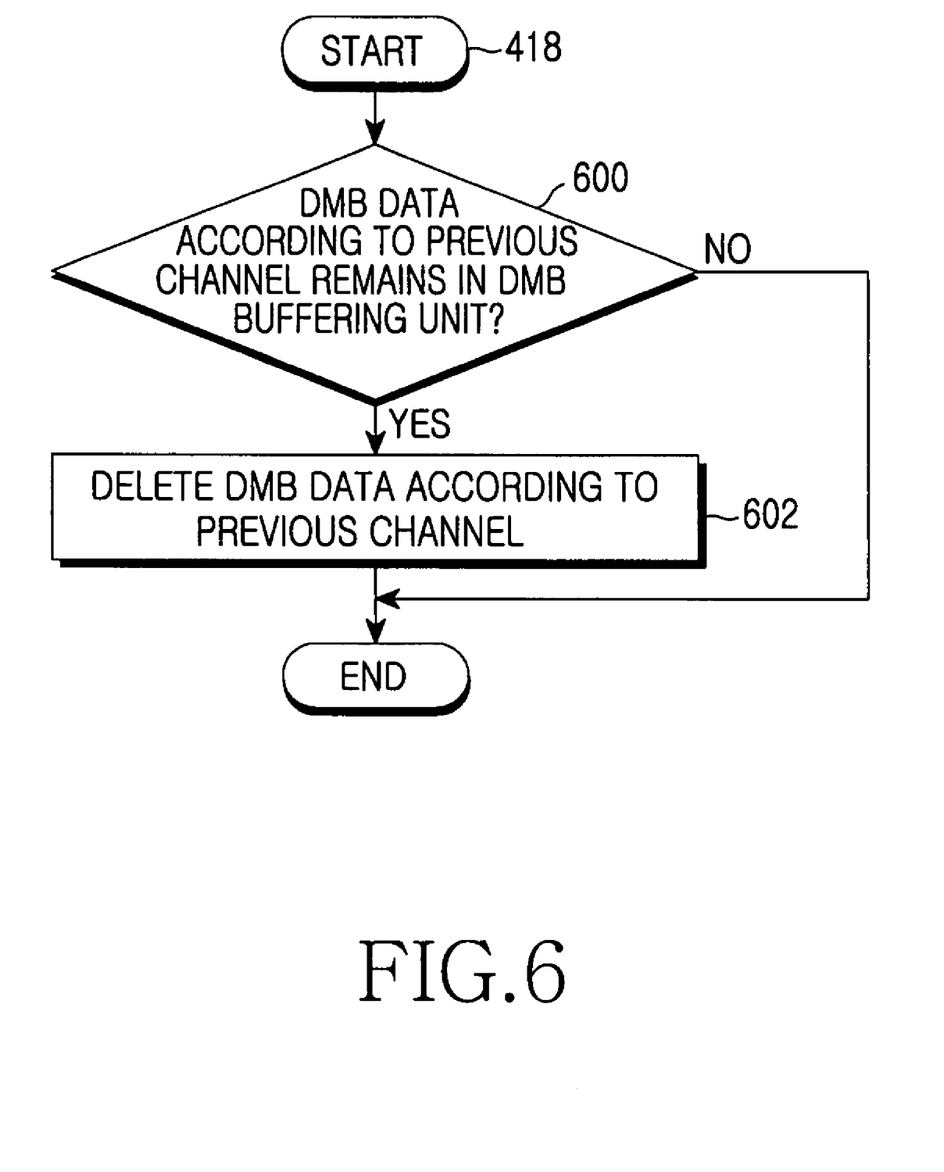
FIG. 6 is a flowchart illustrating a method of deleting DMB data received before a channel change in a DMB receiving terminal according to the present invention.

FIG. 6 is a flowchart illustrating a method of deleting DMB data remaining in the DMB buffering unit 302, which has been received according to a previous channel before a channel change in a DMB receiving terminal according to the present invention.

Referring to FIG. 6, when a DMB program of a changed channel is being output, the DMB receiving terminal according to the present invention determines in step 600 whether DMB data received according to a previous channel before the channel change remains in the DMB buffering unit 302. If it is determined in step 600 that the remaining DMB data does not remain, the controller 300 ends this process. If DMB data is remaining, the controller 300 deletes the DMB data received according to a previous channel before the channel change in step 602.

Herein, a method of determining whether DMB data is remaining may be a method of determining whether DMB data having a PES PID different from that of a currently set channel remains among DMB data stored in the DMB buffering unit 302. In addition, a method of deleting the remaining DMB data may be a method of deleting DMB data having a PES PID different from that of a currently set channel among DMB data stored in the DMB buffering unit 302. Thus, in the present invention, the process of deleting the remaining DMB data can be performed even when the DMB program of the changed channel is being output.

If the storage space of the DMB buffering unit 302 is sufficiently large, the process of deleting the remaining DMB data may be performed when an output of a DMB program ends or when the user does not view the DMB program due to an incoming call, an outgoing call, or transmission or checking of a short messaging service (SMS) or multimedia messaging service (MMS) message instead when the DMB program is being output. Thus, in the present invention, since the process of deleting the remaining DMB data is performed after a channel change is completed or without consideration of the channel change, the process of deleting the remaining DMB data does not affect a time required for the channel change.

As described above, according to the present invention, a channel change of a DMB receiving terminal can be performed without an additional process of stopping or restarting a DMB receiving operation of a DMB receiving unit. Thus, a time required for a channel change in the DMB receiving terminal can be reduced.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for increasing a channel change speed in a digital multimedia broadcasting (DMB) receiving terminal for receiving DMB data and outputting a DMB program, the apparatus comprising:
    a DMB signal receiving unit for receiving DMB data according to a set broadcasting channel;
    a DMB buffering unit for storing the received DMB data;
    a DMB extractor for extracting DMB data corresponding to the set broadcasting channel from among the DMB data stored in the DMB buffering unit; and
    a controller for indicating the set broadcasting channel to the DMB signal receiving unit and the DMB extractor,
    wherein when a user changes the set broadcasting channel to a new set broadcasting channel,
    the controller indicates the new set broadcasting channel to the DMB signal receiving unit and the DMB extractor,
    the DMB signal receiving unit receives DMB data according to the new set broadcasting channel, without stopping a DMB data receiving operation,
    the DMB buffering unit stores the received DMB data according to the new set broadcasting channel, and
    the DMB extractor extracts only the DMB data corresponding to the new set broadcasting channel from among the DMB data corresponding to the previous set broadcasting channel and the new set broadcasting channel stored the DMB buffering unit.

2. The apparatus of claim 1, wherein controller indicates the set broadcasting channel using information on a Packet Elementary Stream Packet Identification (PES PID) or a DMB frequency according to the set broadcasting channel.

3. The apparatus of claim 2, wherein when the controller indicates the set broadcasting channel using the information on the PES PID, the DMB extractor confirms a PES PID according to the new set broadcasting channel and extracts only DMB data having the PES PID according to the new set broadcasting channel.

4. The apparatus of claim 1, wherein the controller deletes DMB data from among the DMB data stored the DMB buffering unit that is does not correspond to the new set broadcasting channel.

5. The apparatus of claim 1, wherein the controller creates and outputs a message for notifying the user that the set broadcasting channel is being changed, when indicating the new set broadcasting channel to the DMB signal receiving unit and the DMB extractor.

6. A method of increasing a channel change speed in a digital multimedia broadcasting (DMB) receiving terminal including a DMB signal receiving unit for receiving DMB signal, a DMB buffering unit for storing DMB data received in the DMB signal, a DMB extractor for extracting DMB data of a currently set channel from the DMB buffering unit, and a controller for indicating the currently set channel to the DMB receiving unit and the DMB extractor, the method comprising:
    receiving, by the DMB receiving terminal, a channel change request from the currently set channel to a new channel;
    changing, by the controller, the currently set channel in the DMB signal receiving unit and the DMB extractor to the new channel, without stopping the DMB signal receiving unit from receiving the DMB signal;
    receiving, by the DMB signal receiving unit, DMB data corresponding to the new set channel;
    storing, by the DMB buffering unit, the DMB data corresponding to the new set channel received through the DMB signal receiving unit;
    extracting, by the DMB extractor, the stored DMB data corresponding to the new set channel from among the stored DMB data corresponding to the previous set broadcasting channel and the new set broadcasting channel; and
    outputting, by the controller, the extracted DMB data corresponding to the new set channel.

7. The method of claim 6, further comprising:
stopping, by the DMB extractor, extracting the DMB data of the currently set channel from the DMB buffering unit, when the controller changes the currently set channel in the DMB extractor to the new channel; and
deleting, by the controller, an existing DMB task for decoding the DMB data received through the currently set channel, before changing the currently set channel in the DMB signal receiving unit and the DMB extractor to the new channel.

8. The method of claim 6, further comprising:
creating, by the controller a new DMB task for outputting a DMB program according to the new channel.

9. The method of claim 6, further comprising outputting, by the controller, a message notifying a user that a channel change is currently being performed.

10. The method of claim 6, wherein the controller changes the currently set channel to the new channel using information on a Packet Elementary Stream Packet Identification (PES PID) or a DMB frequency according to the new channel.

11. The method of claim 6, wherein when the controller changes the currently set channel to the new channel using the information on the PES PID, extracting the stored DMB data corresponding to the new set channel from among the stored DMB data comprises:
    checking, by the DMB extractor, PES PIDs of DMB data stored in the DMB buffering unit;
    extracting, by the DMB extractor, only DMB data having a PES PID corresponding to the new set channel from among the stored DMB data; and
    deleting, by the controller, the extracted DMB data from the DMB buffering unit.

12. The method of claim 6, further comprising:
deleting, by the controller, any DMB data from among the stored DMB data in the DMB buffering unit that corresponds to a channel other than the new channel.

* * * * *